(12) United States Patent
Matsa et al.

(10) Patent No.: US 8,117,530 B2
(45) Date of Patent: Feb. 14, 2012

(54) EXTENSIBLE MARKUP LANGUAGE PARSING USING MULTIPLE XML PARSERS

(75) Inventors: Moshe E. Matsa, Cambridge, MA (US); Eric Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 11/676,344

(22) Filed: Feb. 19, 2007

(65) Prior Publication Data

US 2008/0201697 A1  Aug. 21, 2008

(51) Int. Cl.
G06F 3/048 (2006.01)
(52) U.S. Cl. ......... 715/203; 715/201; 715/234; 715/237
(58) Field of Classification Search ................... 715/200, 715/201, 203, 234, 237, 272, 273, 277
See application file for complete search history.

(56) References Cited

U.S. PATENT DOCUMENTS

| | | | |
|---|---|---|---|
| 5,276,880 A | | 1/1994 | Platoff et al. |
| 5,687,378 A | | 11/1997 | Mulchandani et al. |
| 6,512,775 B1 * | | 1/2003 | Eleftheriades et al. ....... 370/428 |
| 6,950,866 B1 | | 9/2005 | Lowry et al. |
| 6,990,442 B1 * | | 1/2006 | Davis ............................... 704/9 |
| 7,185,232 B1 * | | 2/2007 | Leavy et al. .................... 714/41 |
| 7,188,168 B1 * | | 3/2007 | Liao ............................. 709/224 |
| 7,391,735 B2 * | | 6/2008 | Johnson ......................... 370/246 |
| 7,415,069 B2 * | | 8/2008 | Winger ..................... 375/240.25 |
| 7,586,851 B2 * | | 9/2009 | Panigrahy et al. ............ 370/252 |
| 7,619,983 B2 * | | 11/2009 | Panigrahy ..................... 370/252 |
| 7,620,851 B1 * | | 11/2009 | Leavy et al. .................... 714/41 |
| 7,623,468 B2 * | | 11/2009 | Panigrahy et al. ............ 370/252 |
| 2002/0141449 A1 * | | 10/2002 | Johnson ......................... 370/473 |
| 2003/0023628 A1 | | 1/2003 | Girardot et al. |
| 2003/0159112 A1 | | 8/2003 | Fry |
| 2003/0167315 A1 * | | 9/2003 | Chowdhry et al. ........... 709/218 |
| 2003/0196195 A1 * | | 10/2003 | Sluiman ........................ 717/143 |
| 2004/0148415 A1 * | | 7/2004 | Sikdar ........................... 709/230 |
| 2005/0015676 A1 * | | 1/2005 | Zatloukal et al. ............... 714/38 |
| 2005/0238010 A1 * | | 10/2005 | Panigrahy et al. ............ 370/389 |
| 2005/0238011 A1 * | | 10/2005 | Panigrahy .................... 370/389 |
| 2005/0238012 A1 * | | 10/2005 | Panigrahy et al. ............ 370/389 |
| 2005/0238022 A1 * | | 10/2005 | Panigrahy .................... 370/392 |

FOREIGN PATENT DOCUMENTS

CN  1545665  11/2004

\* cited by examiner

Primary Examiner — Stephen Hong
Assistant Examiner — Gregory J Vaughn
(74) Attorney, Agent, or Firm — Jose Gutman; Fleit Gibbons Gutman Bongini & Bianco PL

(57) ABSTRACT

Disclosed are a method, information processing system, and a computer readable medium for parsing a hierarchical markup document. The method includes initializing a first parser for parsing a hierarchical markup document. The first parser parses the hierarchical markup document. A shared parsing state associated with a set of parsers including the first parser is monitored. The parsing control is passed to at least a second parser. The at least second parser parses the hierarchical markup document. The shared parsing state is also monitored during the parsing by the at least second parser.

20 Claims, 12 Drawing Sheets

| Parser | Parsable Items | Non-Parsable Items _132_ |
|---|---|---|
| Parser 1 | item A | item B |
| Parser 2 | item B | item A<br>item B.1 |
| Parser 3 | item B.1 | ≠ item B.1 |

FIG. 2

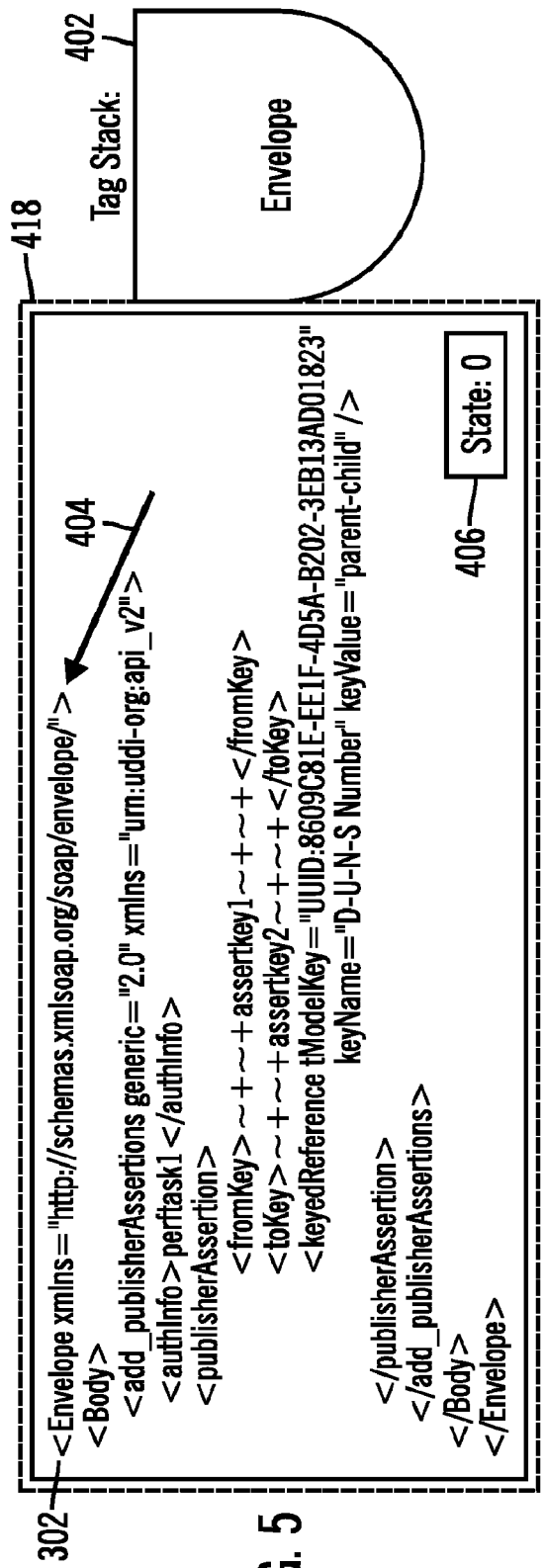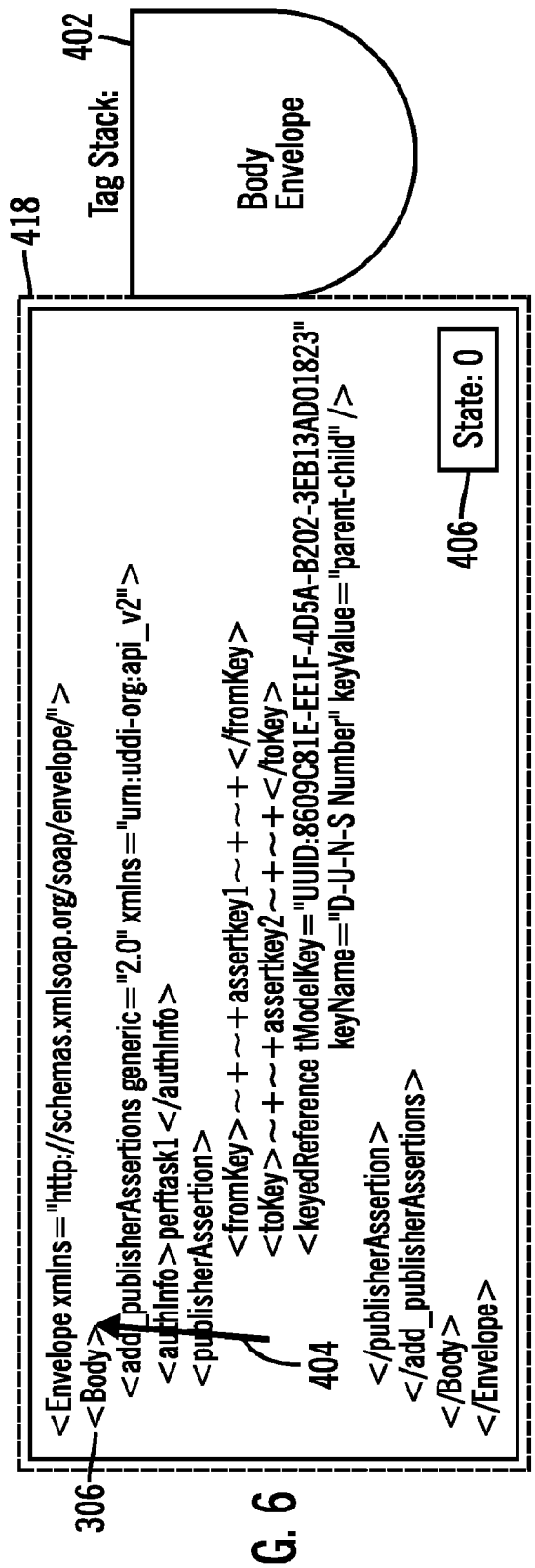
FIG. 5
FIG. 6

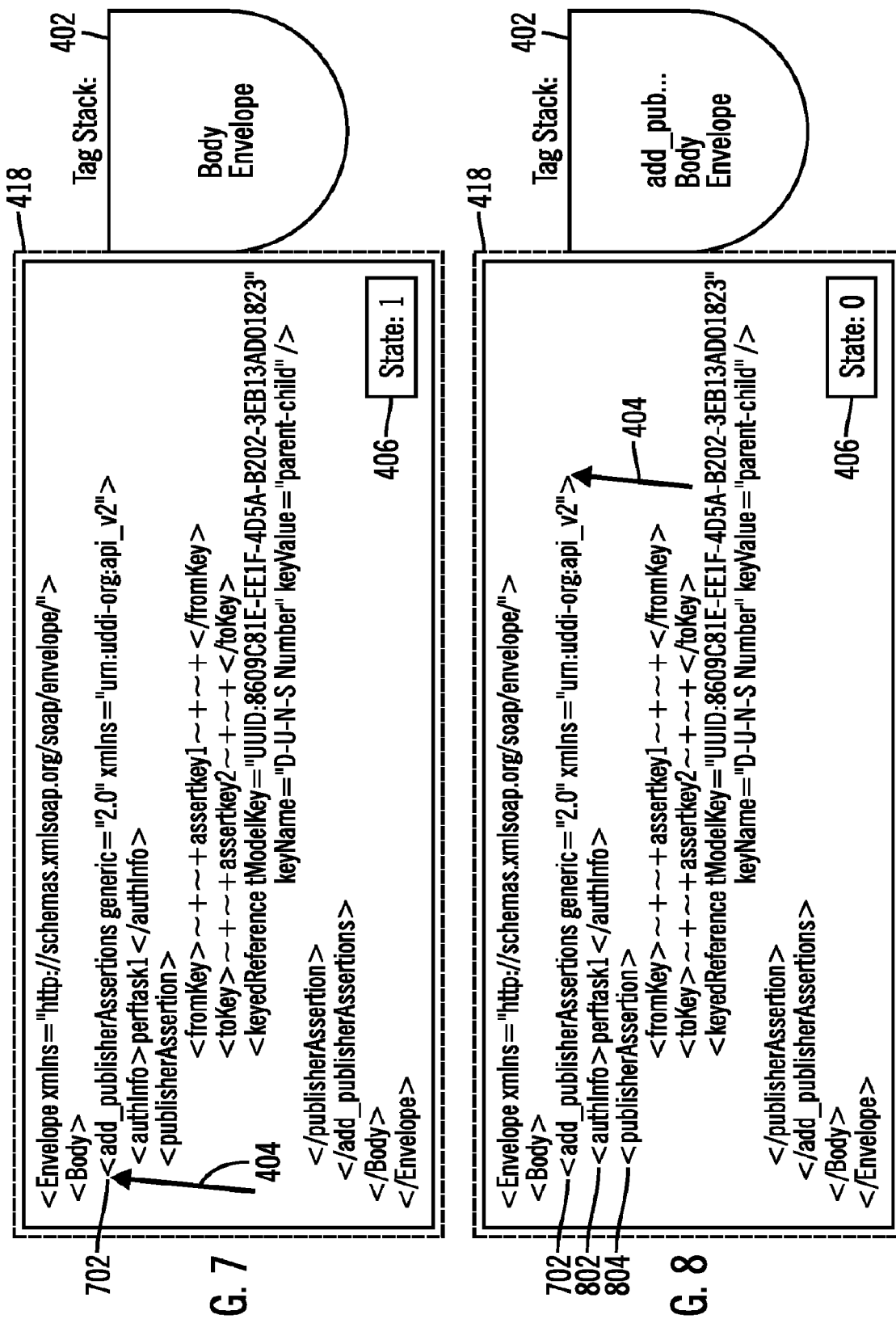

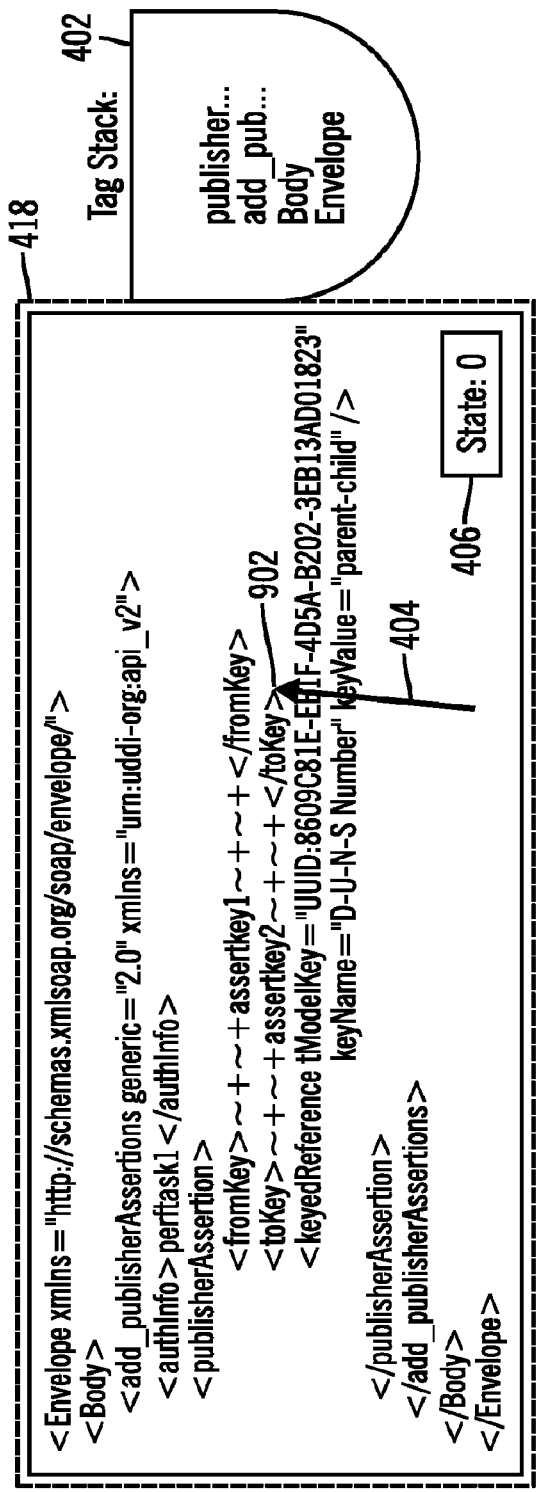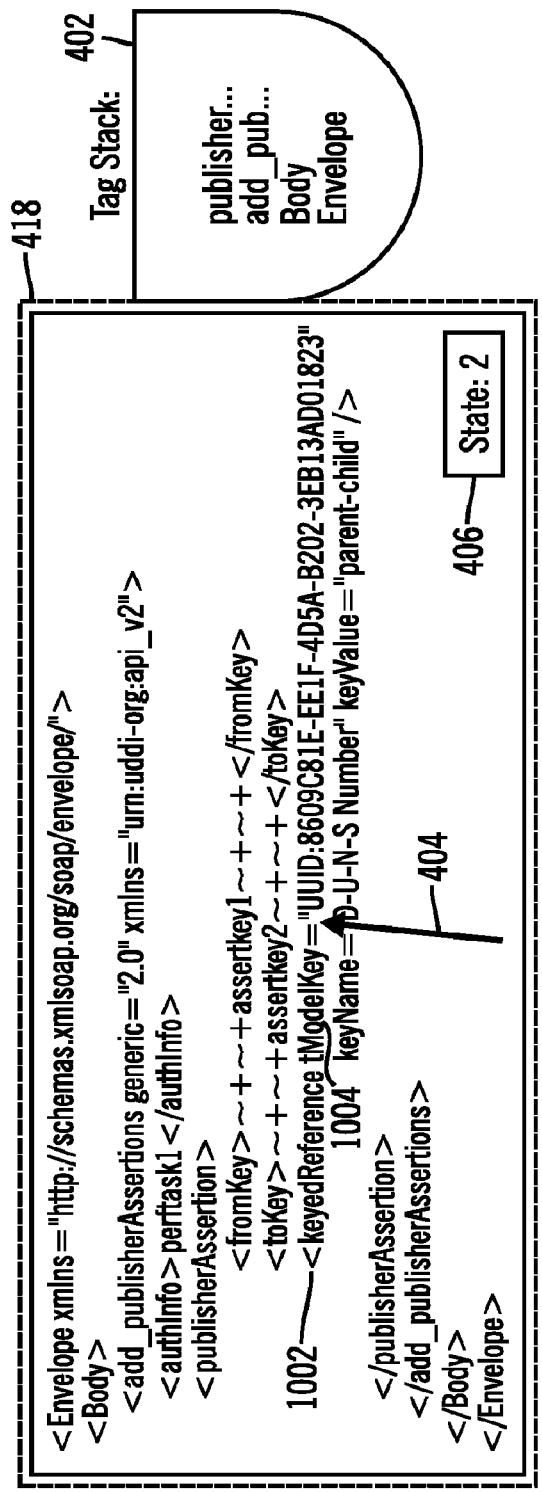

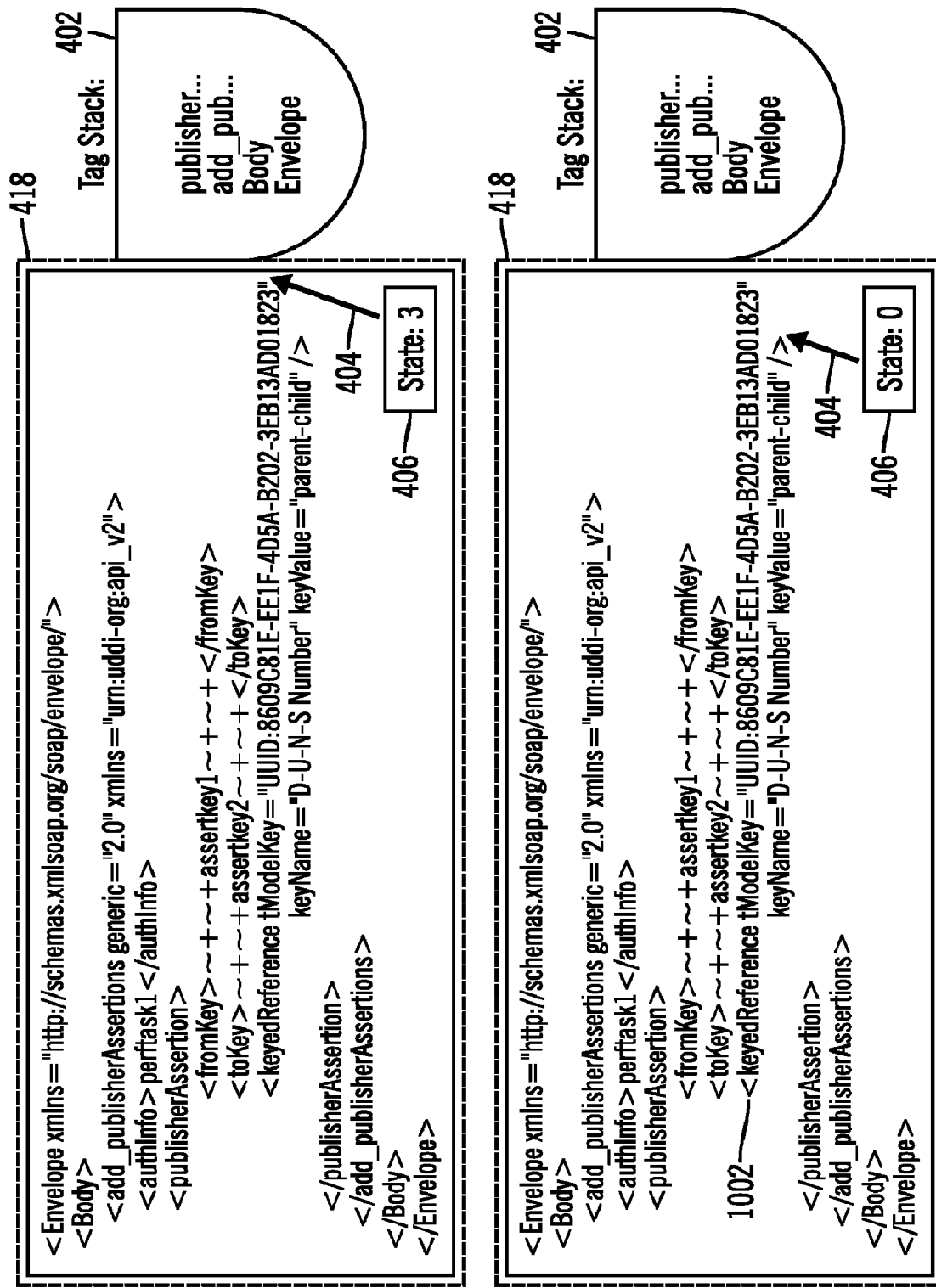

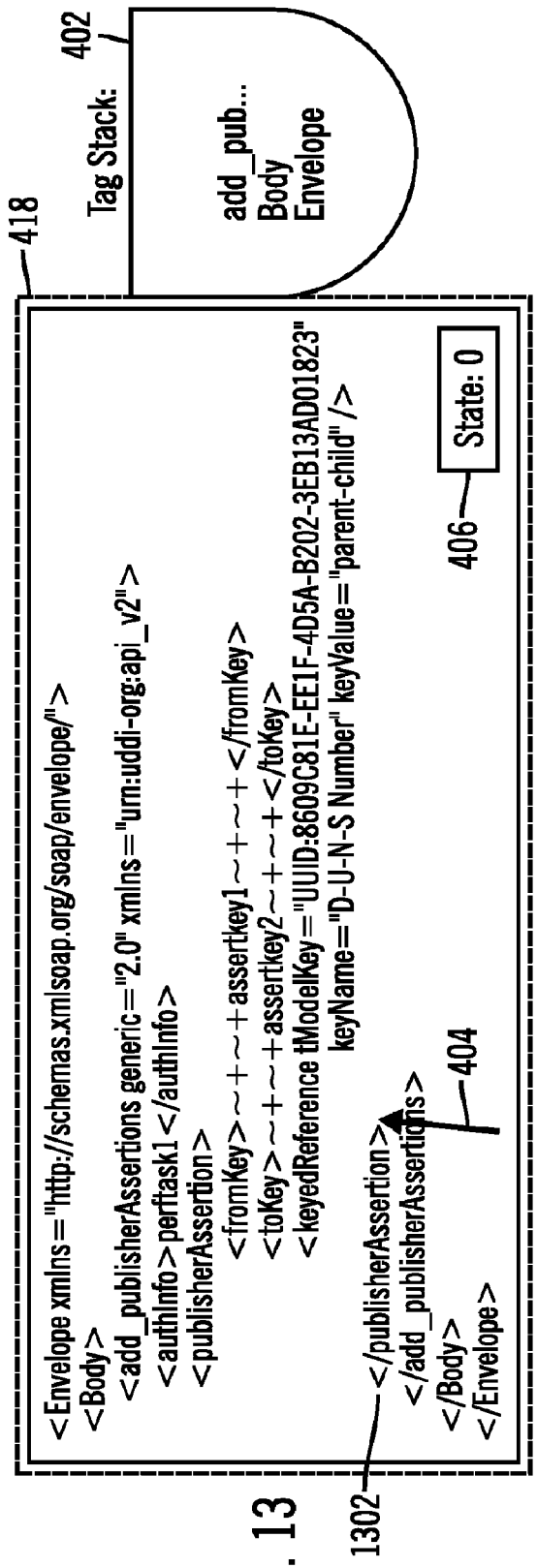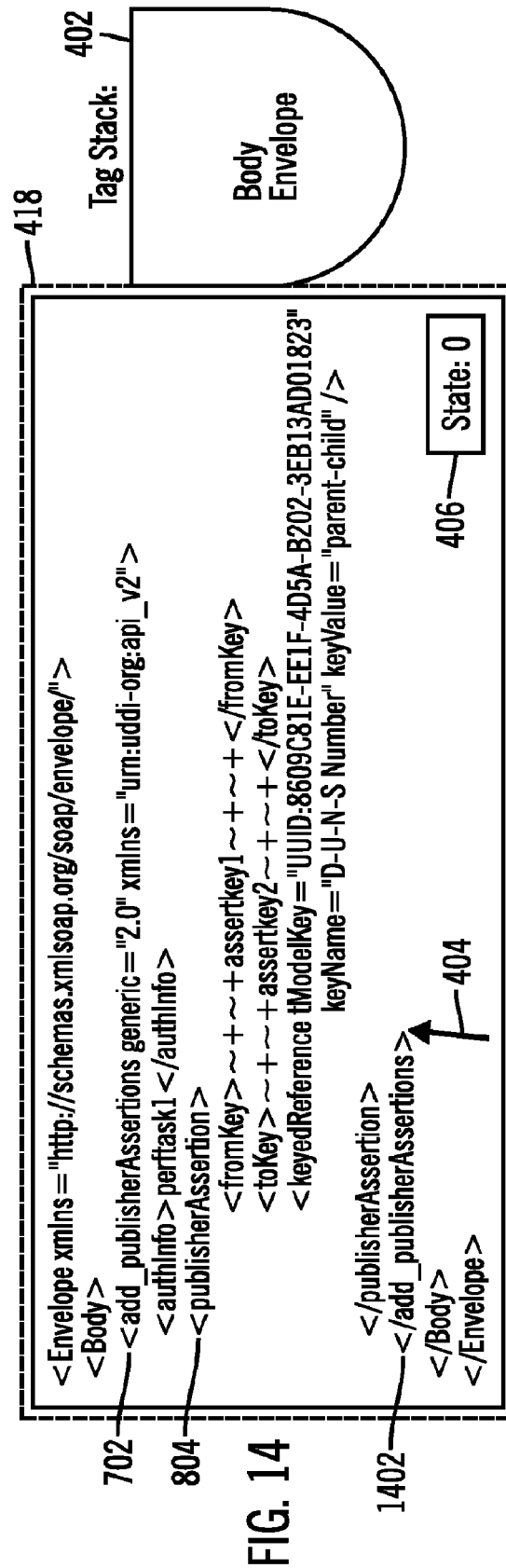

EXTENSIBLE MARKUP LANGUAGE PARSING USING MULTIPLE XML PARSERS

FIELD OF THE INVENTION

The present invention generally relates to the field of hierarchical markup document parsing, and more particularly relates to parsing a hierarchical markup instance using multiple parsers.

BACKGROUND OF THE INVENTION

Extensible markup language ("XML") is a markup language that allows information to be shared between different systems and applications. XML provides a facility to describe and apply a hierarchical structure to information. The processing of XML data requires an XML parser, which generally parses the entire XML document or a portion of the document. While parsing, an XML parser extracts the data out of a textual representation. In other words, an XML parser takes as input a raw serialized bytestream and performs various operations on the bytestream. For example, the XML parser can create new data structures or events from the raw serialized bytestream.

An XML parser also checks the well-formedness of the XML data. For example, the XML parser determines if start tags have matching end tags. XML parsers also validate an XML document to ensure that the document conforms to a Document Type Definition or a XML schema.

One concern with XML parsers is the efficiency and speed of the parsing. For example, inefficient parsing can result in excessive memory usage and processing times. One problem with current XML parsing techniques is that only a single XML parser can parse an XML document. The XML document may include data that can be parsed faster and more efficiently by one parser as compared to another. However, because current parsing techniques do not allow for the joint parsing of an XML document, a general parser is usually selected to parse the data. The general parser in most situations does not parse particular data as fast and as efficiently as a parser written specifically for the particular data.

Therefore a need exists to overcome the problems with the prior art as discussed above.

SUMMARY OF THE INVENTION

Briefly, in accordance with the present invention, disclosed are a method, information processing system, and computer readable medium for parsing a hierarchical markup document. The method includes initializing a first parser for parsing a hierarchical markup document. The first parser parses the hierarchical markup document. A current parsing position of the first parser is monitored. The parsing control is passed to at least a second parser. The at least second parser parses the hierarchical markup document. A current parsing position of the at least second parser is monitored.

In another embodiment of the present invention, an information processing system is disclosed. The information processing system includes a memory and a processor that is communicatively coupled to the memory. A plurality of parsers is included for parsing at least a portion of a hierarchical markup document residing in the memory. The information processing system also includes a parsing controller that is communicatively coupled to the plurality of parsers. The parsing controller is for initializing a first parser in the plurality of parsers for parsing the hierarchical markup document. The first parser parses at least a first portion of the hierarchical markup document. A current parsing position of the first parser is monitored. Parsing control is passed to at least a second parser in the plurality of parsers. The second parser parses at least a second portion of the hierarchical markup document. A current parsing position of the at least second parser is monitored.

In yet another embodiment, a computer readable medium for parsing a hierarchical markup document is disclosed. The computer readable medium includes instructions for initializing a first parser for parsing a hierarchical markup document. The first parser parses the hierarchical markup document. A current parsing position of the first parser is monitored. The parsing control is passed to at least a second parser. The at least second parser parses the hierarchical markup document. A current parsing position of the at least second parser is monitored.

One advantage of the present invention is that parsing performance is enhanced by having multiple parsers parse an XML document. The present invention allows for more specialized parsers to parse data in an XML document that they are designed to parse. A single parser may not be able to parse particular data as fast or as efficient as a more specialized parser. Therefore, by allowing control to be transferred from one parser to another more specialized parser can be sued to yield faster, more efficient parsing.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 illustrates an exemplary parsing control table according to an embodiment of the present invention;

FIGS. 4-16 illustrate one example of parsing the XML instance of FIG. 3 using multiple parsers according to an embodiment of the present invention;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary Information Processing System

Figure 1:
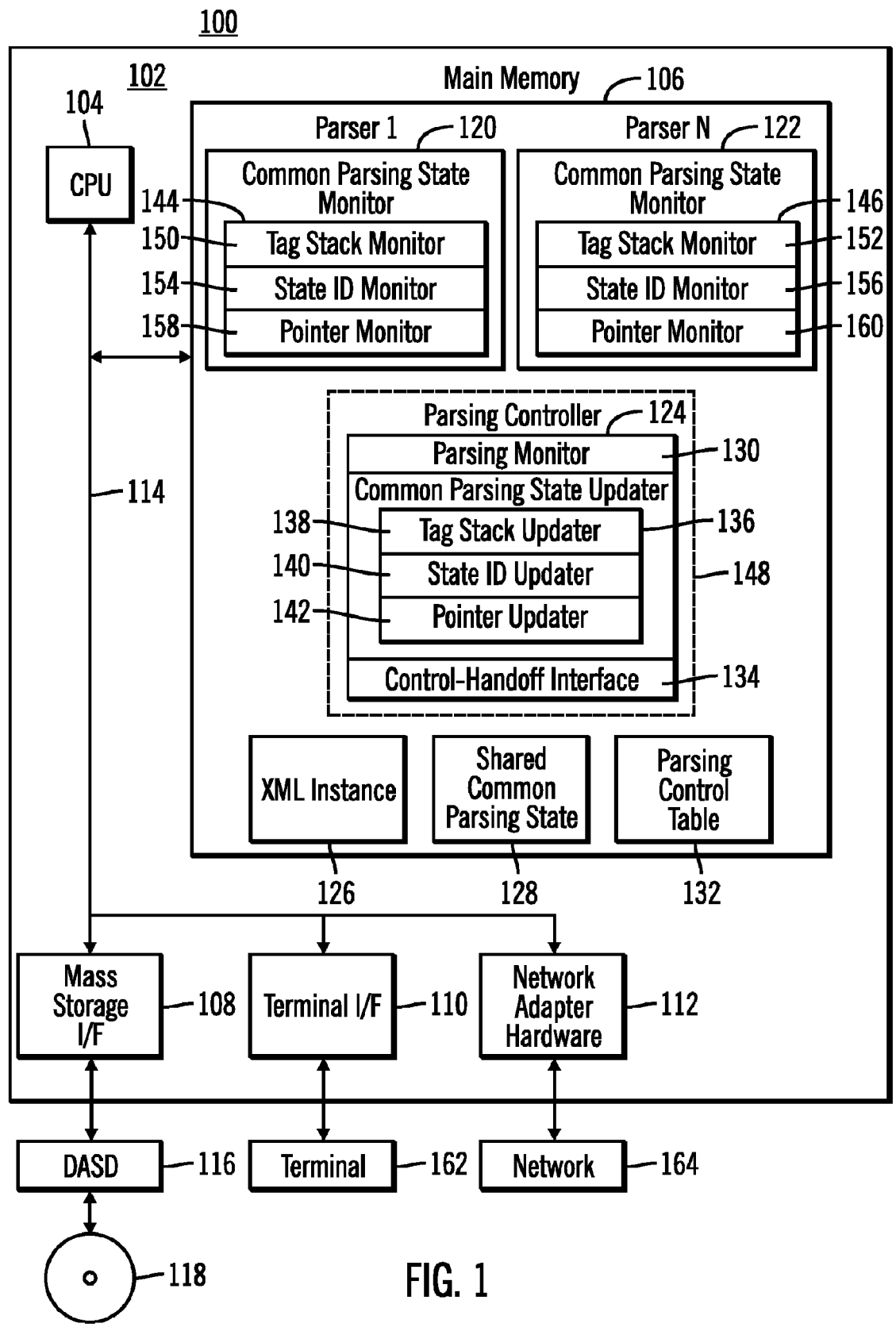
FIG. 1 is a diagram illustrating an information processing system according to an embodiment of the present invention.

According to an embodiment of the present invention, as shown in FIG. 1, an exemplary information processing system 100 is shown. The information processing system 100 is based upon a suitably configured processing system adapted to implement one or more embodiments of the present invention. Any suitably configured processing system is similarly able to be used as the information processing system 100 by embodiments of the present invention, for example, a personal computer, workstation, or the like. The information processing system 100 includes a computer 102. The computer 102 has a processor 104 that is connected to a main memory 106, mass storage interface 108, terminal interface 110, and network adapter hardware 112. A system bus 114 interconnects these system components. The mass storage interface 108 is used to connect mass storage devices, such as data storage device 116, to the information processing system 100. One specific type of data storage device is a computer readable medium such as a CD/DVD drive, which may be used to store data to and read data from a CD/DVD 118 or floppy diskette (not shown). Another type of data storage device is a data storage device configured to support, for example, NTFS type file system operations.

The main memory 106, in one embodiment, comprises a plurality of parsers 120, 122. Each of the parsers 120, 122, in one embodiment, is a hierarchical markup document parser capable of parsing hierarchical markup (documents) 126 such as XML instances. It should be noted that the hierarchical markup document parser 120, 122 according to the present invention is not limited to parsing only XML documents. Data comprising variations of XML and/or other languages that behave substantially similar to XML can also be parsed by the XML parsers 120, 122 of the present invention. It should also be noted that the XML instance 126 can be parsed while being streamed or while residing in the memory 106. In other words, an input buffer 418 (FIG. 4) from which the parsers 120, 122 parse the XML instance 126 can be a streaming input buffer and/or a local memory buffer such as main memory 106.

The parsers 120, 122, in one embodiment, are independent of each other and can jointly parse an XML instance 126. For example, a single XML instance 126 can comprise data that requires different types of processing that can benefit from using multiple parsers. In other words, as compared to using a general parser for the entire XML instance 126, the parsers 120, 122 can be for parsing specific data within the XML instance 126. Take for example a SOAP message, instead of using a general parser to parse the entire message, one XML parser can parse the envelope, another parser can parse the body, and other parsers can parse each header. A parser specializing in parsing particular data can parse the data in a more efficient manner than a general parser resulting in faster parsing times.

In one embodiment, the main memory 106 also includes a common shared parsing state 128, which facilitates the joint parsing of an XML instance 126 by multiple parsers 120, 122. The common shared parsing state 128 indicates the current state of the parsing process. The common shared parsing state 128, in one embodiment, includes a tag-stack 402 (FIG. 4) that includes each start-tag read in by a parser 120, 122 so that it can be later matched by a corresponding end-tag, a pointer 404 (FIG. 4) into the current position in the input buffer 418 (FIG. 4), and a parsing State ID 406 (FIG. 4) that indicates the type of location in the processing at which the parsing control is transferred or can be transferred.

Other states that can be included in the common shared parsing state 126 are an end pointer (not shown) and a prefix mapping environment (not shown) and the stack of changes (not shown) to this environment. The end pointer (not shown) indicates how far the input buffer 418 (FIG. 4) goes to make sure that a parser 120, 122 does not read past the end of the input. The prefix mapping environment (not shown) allows discovery of all in-scope prefix mappings, and the stack of changes (not shown) to this environment allows less-nested environments to be reconstructed upon seeing end tags.

In one embodiment, each parser 120, 122 communicates with a parsing controller 124 for jointly parsing an XML instance. For example, the parsing controller 124, in one embodiment, determines when the parsing control should be transferred from one parser to another. The parsing controller 124 comprises a parsing monitor 130 that monitors the parsing of the XML instance 126. For example, the parsing monitor 130 keeps track of which parser is currently parsing the XML instance 126 and the current position of the parser. The parsing controller 124, in one embodiment, identifies the available parsers for a specific XML instance 126 from a parsing control table 132. The parsing control table 132 includes a list of parsers such as Parser 1 202, Parser 2 204, and Parser 3 206, as shown in FIG. 2.

The parsing control table 132, in one embodiment, also includes for each listed parser the items 208, 210 that can and cannot be parsed by the parser. For example, FIG. 2 shows that Parser 1 202 can parse item A, but not item B. In the example of a SOAP message comprising an envelope (item A) and Universal Description, Discovery, and Integration ("UDDI") element which is the contents of the body (item B), Parser 1 202 might only be able to parse the envelope and not the contents of the body of the Soap message. Parser 2 204 can parse item B (e.g., the UDDI element), but not item A (e.g., the envelope) and item B.1, which is an item within item B (e.g., an attribute of type UUID, such as a tModelKey attribute). Parser 3 206 can parse item B.1 (e.g., the tModelKey attribute of type UUID which is within the body), but cannot parse anything else. It should be noted that the parsing control table 132 is not limited to the configuration shown in FIG. 2. For example, one or more columns and/or rows may be added and/or deleted from the parsing control table 132.

Figure 4:
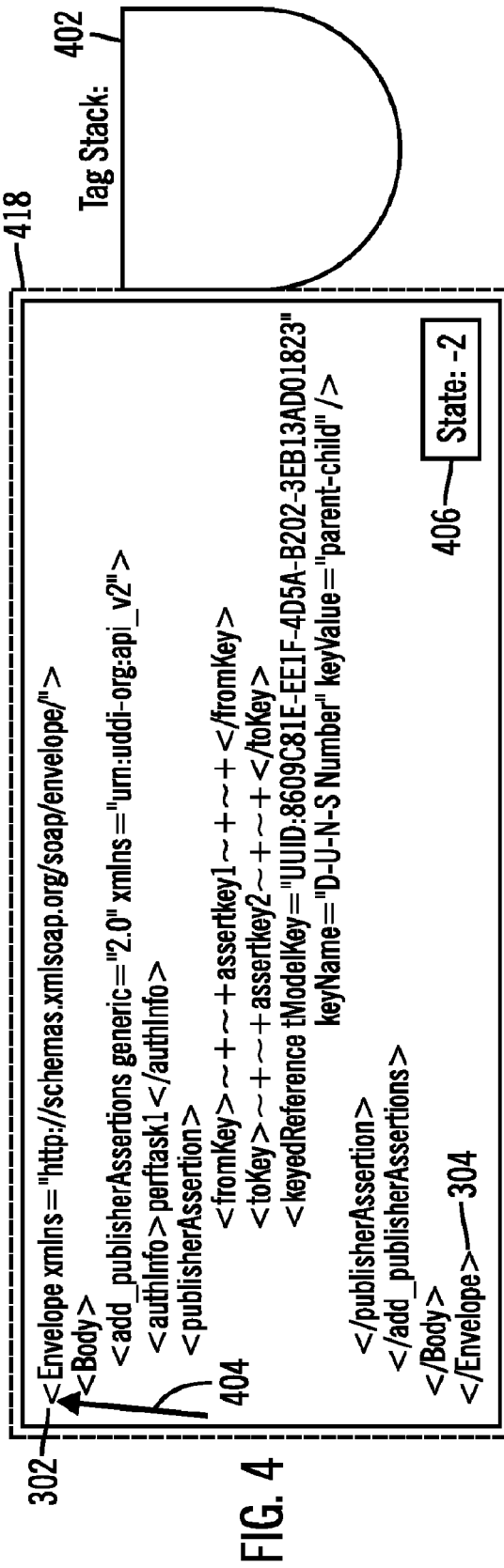

In one embodiment, the parsing control table 132 is created and populated as an XML instance 126 and is received in the input buffer 418 (FIG. 4). Alternatively, the parsing control table 132 can be created and populated as parsers are generated for an XML instance 126. Returning now to FIG. 1, the parsing controller 124 uses the parsing control table 132 to determine which parser 120, 122 to transfer control to. For example, the parsing monitor 130 determines, based on the parsing control table 132, if the parser 120, 122 has reached an item in the XML instance 126 that the parser 120, 122 is not able to parse. If so, the parsing controller 124 searches the parsing control table 132 to determine which parser 120, 122 is able to parse the particular item. The parsing controller 124 then via the control-handoff interface 134 transfers control to the appropriate parser 120, 122.

The parsing controller 124 also comprises a shared parsing state updater 136. The shared parsing state updater 136, in one embodiment, includes a tag stack updater 138, a State ID updater 140, a pointer updater 142, and the like. The tag stack updater 138, in one embodiment, places start-tags on the tag stack 402 (FIG. 4) as they are read in by a parser 120, 122 and pops the tags from the tag stack 402 (FIG. 4) as the corresponding end-tag is read in by a parser 120, 122. The State ID updater 140 updates the parsing State ID 406 (FIG. 4) to indicate the location in processing at which the parsing control is transferred or can be transferred from. As each parser 120, 122 progresses through the XML instance 126, the pointer updater 142 updates the pointer 404 (FIG. 4) to reflect the current parsing position in the XML instance 126.

In one embodiment, the parsing controller 124 communicates the shared parsing state information 128 to the parser 120, 122 that it transfers parsing control to. The parser 120, 122 monitors each of the shared parsing states via a shared parsing state monitor 144, 146. The shared parsing state monitor 144, 146, in one embodiment, includes a tag stack monitor 150, 152, a parsing State ID monitor 154, 156, and a pointer monitor 158, 160. The parser 120, 122, in one embodiment, uses this information, for example, to determine where to start parsing via the pointer 404 (FIG. 4). The shared parsing state information 128 also includes the State ID 406 (FIG. 4), which allows the parser 120, 122 to determine the type of parsing to perform next. For example the parser 120, 122, based on the State ID, can determine that it next needs to parse an XML element, an XML attribute, or trailing miscellaneous data at the end of an XML document. The tag stack information passed on to the parser 120, 122 by the parsing controller 124 allows the parser 120, 122 to add start tags to the tag stack 402 (FIG. 4) if it parses start tags. The tag stack information also allows the parser 120, 122 to pop tags from the tag stack 402 (FIG. 4) and validate well-formedness against them when the parser 120, 122 parses end tags. In one embodiment, the parsers 120, 122 communicate shared parsing state information (e.g., tag stack, State ID, pointer information) back to the parsing controller 124 so that it may update the shared parsing state 128. For example, if a start-tag needs to be placed onto or taken off of the tag stack 402 (FIG. 4), the parser 120, 122 can communicate this information to the parsing controller 124.

In another embodiment, an external parsing controller 124 is optional as denoted by the dashed lines 148. In other words, each parser 120, 122 can have its own internal parsing controller (not shown) similar to the parsing controller 124 described above. In this embodiment, each parser 120, 122 comprises its own shared parsing state updater (not shown). In this embodiment, each parser 120, 122, determines when to transfer control to another parser and which parser to transfer control to. For example, in one embodiment, each parser 120, 122 recognizes what it can and cannot parse. If a parser 120, 122 reaches an item in the XML instance 126 that it cannot parse it searches the parsing control table 132 for the parser that can parse the item. In one embodiment, parsers advertise which types of XML they parse in an ideal way, which types of XML they can parse in a generic way, and which types of XML they do not know how to parse at all. Since this information is known at the time the parser was written or generated, it can be included with the parser.

In an alternative embodiment, a parsing control table 132 is not used. Each of the parsers 120, 122 are self aware of the other parsers required to parse the XML instance 126. For example, an application associated with the XML instance 126 that initiates the parsing process can pass parameters to each required parser. These parameters notify each parser of the identity of the other parsers and their parsing abilities. For example, in one embodiment a SOAP parser knows that a UDDI body can be parsed by a UDDI parser. In another embodiment, a UDDI application runs a SOAP parser and as part of the call to start the SOAP parser the application passes the SOAP parser the UDDI namespace. The UDDI application can also pass the SOAP parser the UDDI parser which can parse, validate, and deserialize any tag in the UDDI namespace in an ideal manner. As stated above, each parser 120, 122 recognizes items in the XML instance 126 that it can and cannot parse. When a parser 120, 122 reaches an item it cannot parse it transfers control to the appropriate parser via a control-handoff interface (not shown). Once the "sub-contracted" parser is finished, the parsing control is transferred back to the previous parser.

One advantage of the present invention is that parsing performance is enhanced by having multiple parsers parse an XML document. The present invention allows for more specialized parsers to parse data in an XML document that they are designed to parse. A single parser may not be able to parse particular data as fast or as efficient as a more specialized parser. Therefore, transferring control from one parser to another more specialized parser can yield faster, more efficient parsing.

Although illustrated as concurrently resident in the main memory 106, it is clear that respective components of the main memory 106 are not required to be completely resident in the main memory 106 at all times or even at the same time. In one embodiment, the information processing system 100 utilizes conventional virtual addressing mechanisms to allow programs to behave as if they have access to a large, single storage entity, referred to herein as a computer system memory, instead of access to multiple, smaller storage entities such as the main memory 106 and data storage device 116. Note that the term "computer system memory" is used herein to generically refer to the entire virtual memory of the information processing system 100.

Although only one CPU 104 is illustrated for computer 102, computer systems with multiple CPUs can be used equally effectively. Embodiments of the present invention further incorporate interfaces that each includes separate, fully programmed microprocessors that are used to off-load processing from the CPU 104. Terminal interface 110 is used to directly connect one or more terminals 162 to computer 102 to provide a user interface to the computer 102. These terminals 162, which are able to be non-intelligent or fully programmable workstations, are used to allow system administrators and users to communicate with the information processing system 100. The terminal 162 is also able to consist of user interface and peripheral devices that are connected to computer 102 and controlled by terminal interface hardware included in the terminal I/F 110 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 100. The network adapter hardware 112 is used to provide an interface to a network 164. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. CD 118 and its equivalents, floppy disk (not shown), or other form of recordable media, or via any type of electronic transmission mechanism.

An Example of Transferring Parsing Control Between Multiple Parsers

FIGS. 3-16 illustrate one example of jointly parsing an XML instance by multiple parsers. This example uses a SOAP message as the XML instance 126. It should be noted that the following discussion is only one example of an XML instance and related parsers for parsing the XML instance. The present invention is not limited to a SOAP message and parsers for parsing a SOAP message. As stated above, any document based on XML and its variations along with relevant parsers is encompassed by the present invention.

Figure 3:
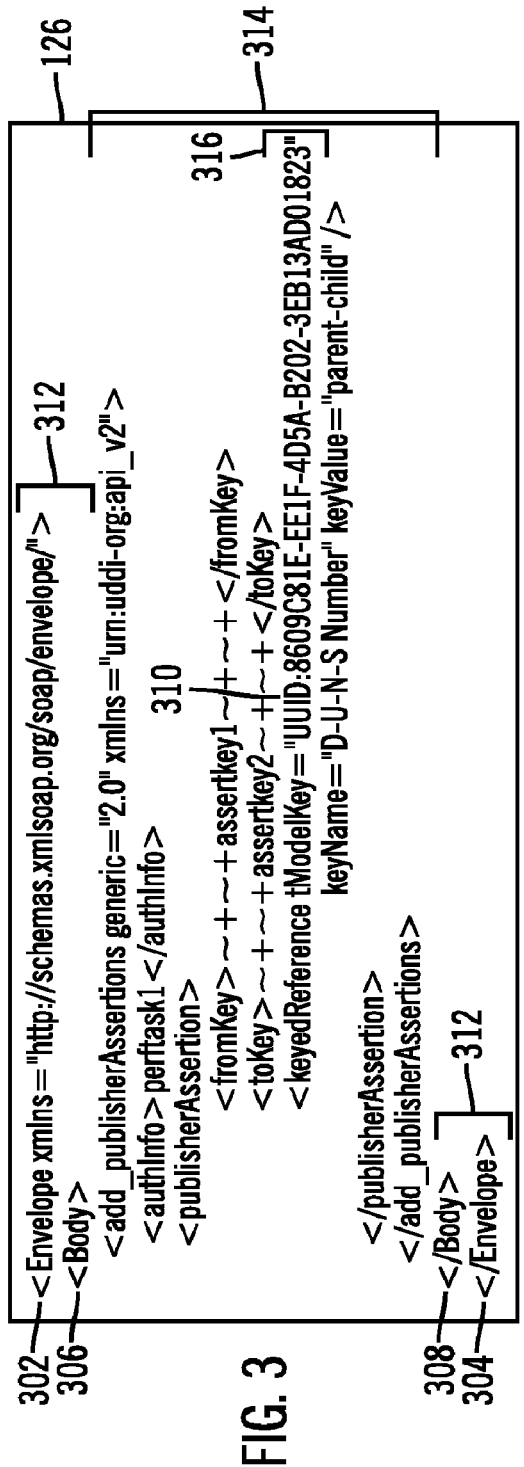
FIG. 3 illustrates an exemplary XML instance according to an embodiment of the present invention.

The XML instance 126 of FIG. 3 makes use of the SOAP protocol and comprises UDDI information in the contents section of the message body. The Envelope tags 302, 304 and the Body tags 306, 308 in this example can be understood by any SOAP engine, whereas the contents of the Body tag 306 can be understood by an application that knows about UDDI in particular.

The SOAP Envelope 302 and Body 306 are needed for processing by the SOAP engine, and the details for these tags 302, 306 are specified in a schema in the SOAP specification. The application receiving the message is not concerned with the SOAP Envelope, but is concerned with the reception of a valid SOAP message and with the contents of the message. In particular, the UDDI application wants the message contents in a UDDI-specific form such as JAX-RPC objects that are derived from the UDDI schema.

Additionally, there are some parts of the XML instance 126 that can be better parsed by specialized parsers. For example, a schema-specific parser might defer to a generic scanner in the case of wildcard content in the schema. Also, any parser might defer to a specialized integer scanner when it determines that it is about to read in an integer. The parser might determine that an integer is next because of a schema that requires the next value to be an integer or because the instance explicitly tags the next value as being of type integer via the xsi:type attribute.

In this case, a specialized scanner can be used that parses the Universally Unique Identifier ("UUID") 310, and stores the value in a special UUID structure in the form of tModelKeys required by the UDDI application. While integers might be able to be translated by a generic parser or normal generated parser, the ability to turn this UUID into the structure required in this particular application is likely not part of any generic functionality. Thus, this functionality can be added as a simple specialized scanner that only handles reading in UUID values such as tModelKey attributes and is invoked by the general parser of UDDI segments when it is about to read an attribute that is typed in the schema as being of a tModelKey type.

FIG. 3 shows the XML instance 126 being broken into three sections for illustration purposes. The first section 312 is of interest to a parser generated for the SOAP engine. The second section 314 is of interest to a parser generated for the UDDI application. The third section, which is "UUID: 8609C81 E-EE1F-4D5A-B202-3EB13AD01823", can be handled by a specialized scanner written for the UDDI application to parse UUID values such as tModelKeys. Therefore, an illustrative example of jointly parsing of the XML instance 126 is discussed below with respect to three parsers, a SOAP parser, A UDDI parser, and a UUID parser.

As stated above, joint parsing is enabled through the shared parsing state 128. The control-handoff interface 134 that resides within the parsing controller 124 or the parsers 120, 122 themselves ensures that control returns to the current parser at an appropriate (balanced) point in the document once the expected parsing has been done by other "subcontracted" parsers. In the example of the SOAP message 126, a virtual stack of parsers 120, 122 is used. In other words, each parser 120, 122 can pass its own pointer to the next parser when it starts up the next parser with the current state.

In one embodiment, each parser 120, 122 returns blocking calls from its caller with the new State ID. Alternatively, the State ID is passed in a blocking call to the next parser. In one embodiment, a strict nesting of parser executions is assumed and thus the parsing control does not make use of certain kinds of shared state. For example, in a strict nesting, each parser still needs to know the active prefix mappings, but does not need to know the stack of previous prefix mappings. Additionally, in a strict nesting, each parser still needs to share the pointer into the input buffer, but does not need to share the tag stack. In another embodiment, the shared state is used to aid in non-strictly-nested parser control flows. In these cases, more shared state is required, for example, the stack of prefix mapping changes and the tag stack are both required shared state in non-strictly-nested scenarios.

In the current example, the SOAP message 126 was received by the information processing system 100, which, in one embodiment, is running a SOAP server on a given port via an internet connection. The SOAP engine, in one embodiment, determines that the SOAP message 126 is intended for one of the currently running web services on the information processing system. Given the port that the message 126 came in on, a SOAP application can determine that the SOAP message 126 is intended for the UDDI server.

FIG. 4 shows the SOAP message 126 at an initial parsing state. The SOAP application initiates a generated SOAP-XML-parser, which starts on SOAP message 126 by setting up an empty shared parsing state 128. This includes an empty tag stack 402, an input buffer 418 for the SOAP message 126, a pointer 404 to the first byte of the SOAP message 126 as the current pointer, and a State ID 406 of −2. The State ID 406, in one embodiment, is an identifier that indicates which of several types of parsing must be performed next. For example, one State ID indicates that parsing should continue by identifying an XML element, another State ID indicates that parsing should continue by identifying an XML attribute. Yet another State ID indicates that parsing should continue by identifying the beginning of an XML document, possibly with an XML declaration. A State ID 406 of −2, in this example, indicates that the parsing process is at the beginning of the document. The initial State ID 406 of −2 can also indicate that the first data segment may contain an XML header and that there can be white space but no CDATA sections before the first tag. It should be noted that the present invention is not limited to the State ID 402 being a specific number, symbol, text string, or the like. The numbers used in this example are for illustrative purposes only.

The SOAP parser parses through the first data-tag 302, where the data happens to be empty in this example but can have the prologue of the document. The first data-tag 302 is of QName {http://schemas.xmlsoap.org/soap/envelope/, Envelope}, which is valid according to the SOAP specification and schema. Thus, the parser validates the tag 302 and continues to parse through the SOAP message 126. The SOAP parser pushes the start-tag 302 on the top of the tag stack 402, as shown in FIG. 5. The exact syntax of the start-tag 302 is used because this exact syntax needs to be matched by the end-tag 304, which can be matched by a different parser.

For example, a parser can be used that only wants to handle sub-content in the SOAP message 126. This parser might not be able to determine if there is more of that sub-content until it reads in the </Envelope> end tag 304 and might read in that end tag 304 prior to determining that it was not interested in it. At this point, the parser can back up the current pointer 404 or compare the tag 304 (that was just read in) against the top of the tag stack 402. The parser finds that the start-tag 302 in the tag stack 402 matches the end-tag 304 just read in. Therefore, the parser pops the tag stack 402 and indicates in the return that it had parsed an extra valid end-tag 304.

As shown in FIG. 5, when the SOAP parser reaches the end of the start-tag 302, it updates the current pointer 404 to show the parsing position. The State ID 406 is updated, either by the SOAP parser or the parsing controller 124, to have the value 0. The State ID 406 after a parser reaches the end of a tag indicates, in one embodiment, that "next should come optional data followed by a start or end tag". In other words, the pointer 404 is between data-tag tokens.

A data-tag token, in one embodiment, is a representation of a part of an XML document, including a preceding segment of character data followed by an XML tag, which can be a start tag, an end tag, or a self-closing tag. This transition point, indicated by the State ID value of 0, of being between two data-tag tokens, is a good place to leave the pointer between major steps of a parser's work, and between parsers transferring control of the parse while working on the same document. Due to XML namespaces and xsi:type information from XML Schema, parts of a start tag can not be conclusively validated until the end of the start tag, yet everything that has been parsed can be unambiguously validated at the end of the start tag. For this and other reasons, this transition point is useful for the exemplary embodiment of the present invention.

The next data to be read in by the SOAP parser is legal white space, followed by a valid <Body> tag 306, which gets added onto the tag stack, as shown in FIG. 6. Note that again the tag of QName {http://schemas.xmlsoap.org/soap/envelope/, Body} is what is legal at this point and validates against the schema. However, the syntax of "Body", in one embodiment, is what needs to get matched by a corresponding end tag 308 and is added on the top of the stack 402. If this XML instance 126 has bound the SOAP namespace to the prefix "soap" using an "xmlns:soap" attribute instead of binding that namespace to the default empty prefix, then the tag stack 402 would get the syntax "soap:Body". This is still syntax directly from the SOAP message 126 and not a QName. Once again, the State ID 406 is 0, because pointer 404 is left between data-tag tokens. Note that the SOAP parser maintains this state even while the SOAP parser is working and does not expect to have control transferred to another parser. This enables scenarios where control is transferred at points that the parsers do not initially expect.

After reaching the end of the "Body" start-tag 306, the SOAP engine determines that the body of the SOAP message 126 is understood by the UDDI engine and that the UDDI application desires to view the body in some specific deserialization that is most useful to it. As mentioned above, the SOAP engine has determined that this is a UDDI message because of the port that the SOAP message 126 came in on. However, in one embodiment, the SOAP engine does not hand over control of the parse to a UDDI parser just yet. The SOAP engine, in one embodiment, does not want any data (mixed content) in the body element before its children. So, first the SOAP parser reads in white space and advances the current pointer 404 beyond the white space to the point of the next start-tag 702, as shown in FIG. 7. The SOAP parser updates the State ID 406, e.g., to 1, to indicate that the data portion of the next data-tag token 702 has already been read in and the pointer 404 is pointing to the beginning of the next tag 702. This prevents the next parser from having to skip possible white space and is guaranteed that there is no white space before the next tag 702.

The SOAP parser is now ready to transfer control flow to a UDDI-parser. The UDDI parser, in one embodiment, is auto-generated based on the UDDI v2 schema. The UDDI parser, in one embodiment, checks the State ID 406 from the current state and begins parsing the first tag 702 at the current pointer 404. The UDDI parser recognizes tag 702 as a parsable item. Note that this example redefines the prefix mapping on this element, but even if it had been defined above, the UDDI parser can still understand it because of prefix mappings (not shown) defined in the shared parsing state 128. The UDDI parser adds the tag 702 name at the top of the tag stack 404, as shown in FIG. 8. The UDDI parser then updates the State ID 406 (e.g., to 0) to indicate that the parsing process is between data-tag tokens and advances the current pointer 404.

Processing continues and the UDDI parser recognizes that the add_publisherAssertions tag 702 legally takes an authInfo child 802 followed by a publisherAssertion child 804, and so on. The UDDI parser validates all complex and simple types along the way, as well as well-formedness checking, and deserializing all needed information into appropriate data structures for the UDDI application. The UDDI parser validates, but does not deserialize any data that is not needed by this UDDI server. Eventually, The UDDI parser reaches the end of the toKey end tag 902 as shown in FIG. 9. The UDDI parser updates the State ID 406 (e.g. to 0) to indicate that the parsing process is between two data-tag tokens and updates the pointer 404 accordingly.

The next tag processed by the UDDI parser is the keyedReference tag 1002, as shown in FIG. 10. In this tag 1002, the UDDI parser recognizes the tModelKey attribute 1004, which is of type tModelKey in the UDDI v2 schema. The rules of XML can not guarantee at this point of the parse that the element really is {urn:uddi-org:api_v2, keyedReference} because there could be a later xmlns attribute that redefined the default prefix mapping. Similarly, the rules of XML Schema can not guarantee that such a tag can be validated against type {urn:uddi-org:api_v2, keyedReference} because there can be a later xsi:type attribute that redefined the type of this element. Nonetheless, the UDDI parser optimistically determines that this tag 1002 of local name keyedReference is the tag {urn:uddi-org:api_v2, keyedReference} which is legal at this point in the schema and that it does not have an xsi:type attribute on it which changes the type to validate. Therefore, the UDDI parser optimistically determines that the {, tModelKey} attribute is the legal optional attribute in the assumed complex type, which itself can then be validated against the simple type {urn:uddi-org:api_v2, tModelKey}.

In one embodiment, the UDDI server's code can be such that an application-specific hand-written specialized scanner for tModelKey attributes is generated. This tModelKey parser can determine that the tModelKey attributes are UUIDs and determines the exact data structure that is required for use of them by the application. The general UDDI parser can call this specialized scanner to parse, validate, and deserialize this attribute value. The State ID 406 is set (e.g., to 2) to indicate that an attribute value is about to be read in, as shown in FIG. 10. The UDDI parser then transfer control to the tModelKey/UUID parser.

The tModelKey/UUID parser verifies that the State ID 406 is 2, since this is the only state that it understands how to proceed with. The tModelKey/UUID parser finds the initial double quote character and recognizes that the attribute value must be matched by a closing double quote character. Then the tModelKey/UUID parser verifies that the first five characters are "UUID:" as required, and parses the rest of the UUID into the application-specific UUID data structure which it desires for tModelKey values. Note that the type of this attribute value according to the UDDI v2 schema is a generic xsd:string (actually, the trivial restriction thereof).

One advantage of the present invention is that limitations do not exist for how this deserialization is composed with deserializations from other parsers. In one embodiment, the tModelKey/UUID parser can pass an event at this point with the tModelKey directly to the UDDI application and never inform the other parsers about it. In another embodiment, the tModelKey/UUID parser can return a pointer associated with this data structure to the UDDI parser. This allows the UDDI parser to incorporate this structure into its own data structure which it is deserializing into for the UDDI application. In yet another embodiment, the shared state can be used in a more generic way to compose the pieces of the deserialization. For example, the shared parsing state could include a stack of objects currently being deserialized into; a place to deserialize the next sub-object; and a way to find the place for the next sub-object after that. It should be noted that these are non-limiting examples of cooperatively deserializing an object using shared state. Additionally, any of these embodiments can be used in any combination thereof.

Upon completing a successful parse, validation, deserialization, and confirming the end double quote, the tModelKey/UUID parser updates the State ID 406 (e.g., to 3) to indicate that the parsing process is positioned just after an attribute value, as shown in FIG. 11. The pointer 404 is also updated to reflect the current position of the parsing process. The tModelKey/UUID parser returns control flow to the UDDI parser.

The UDDI parser determines that the State ID 406 is 3 (e.g., that the parsing processing process is at a position just after an attribute value) and searches for white space. The UDDI parser also searches for optional attributes and continues to parse and validate against the complex type that it was working on before. In one embodiment, each parser retains a local state (not shown) for retaining local information such as what type it was validating when it transferred control to another parser. However, in another embodiment, this information can be kept in the shared parsing state 128.

Upon completion of parsing the keyedReference tag 1002, the UDDI parser updates the State ID 406 (e.g., to 0) to reflect that the parsing is between data-tag tokens, as shown in FIG. 12. The pointer 404 is also positioned at the end of the keyed Reference tag 1002. Since the previous start tag 1002 was self-closing, the tag name keyedReference is not left on top of the stack. In another embodiment, the start tag 1002 (keyedReference) can be placed on top of the stack 404 while the keyedReference tag 1002 was being processed. This enables the tag to be removed from the stack 402 at a time when the parse of the self-closing tag is completed by another parser.

As each end tag is reached, it is compared against the start tag at the top of the tag stack 402 and popped from the tag stack 402. The UDDI parser continues parsing, validating, and deserializing while possibly passing events to the UDDI server as it goes. The UDDI parser can also build up the deserialized state for later transfer to the application. The UDDI parser reaches the end-tag 1302 of the publisherAssertion start tag 804. Therefore, the UDDI parser updates the State ID 406 (e.g., to 0) to indicate that the parsing process is positioned between data-tag tokens, as shown in FIG. 13. The UDDI parser also updates the pointer 404 to point to directly after the end-tag 1302.

FIG. 14 shows the UDDI parser reaching the end-tag 1402 of the tag 702 add_publisherAssertions that it started with. The UDDI parser determines that parsing control should be transferred back to the SOAP parser. The UDDI parser updates the State ID 406 (e.g., to 0) to reflect that the parsing processing is between data-tag tokens. The UDDI parser also updates the position of the pointer 404 to point to the end of the publisherAssertion tag 1402.

Figure 15:
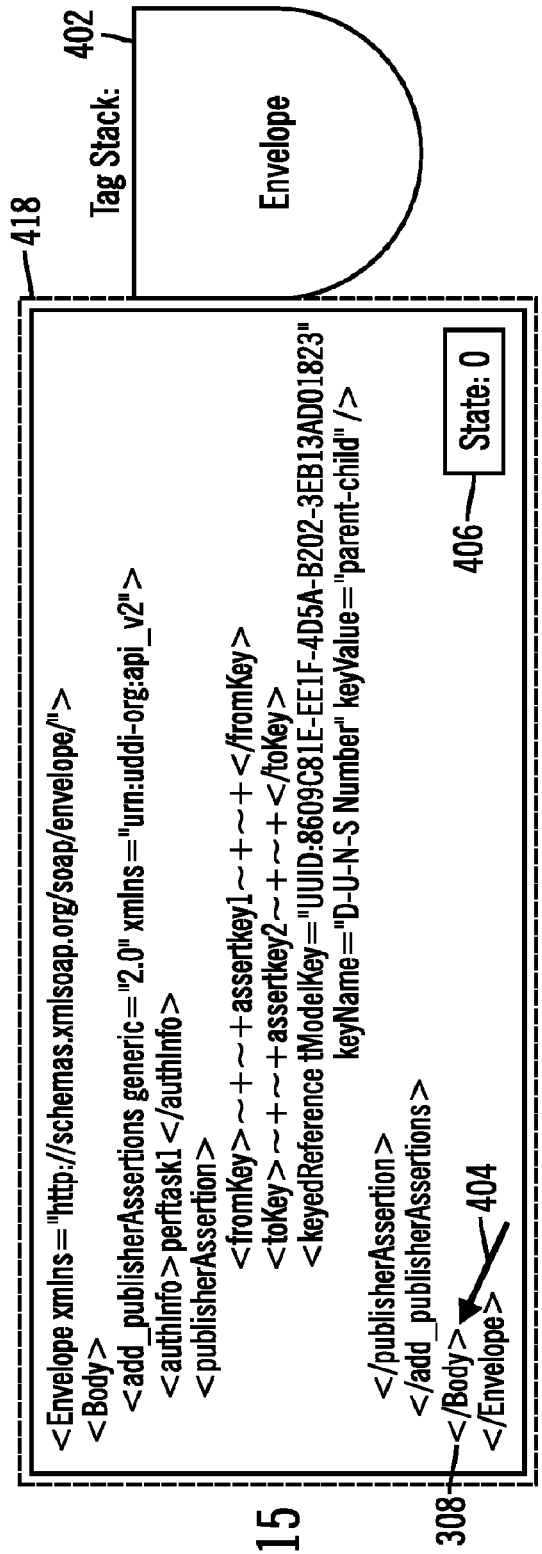

In one embodiment, another parser can parse more than one element, possibly not knowing how many elements are at this level. In this situation the parser may actually parse the close tag for the Body element before it recognized that it was done. In one embodiment, such a situation results in the parser backing up and then passing control to the other parser. In another embodiment, such a situation results in the parser recording that it went a little further and what it found in the shared parsing state 128. In this embodiment, the parser does not back up and transfer control to the other parser. In the current example, the UDDI parser determines that it is finished parsing. If it has been building up a deserialized data structure for the UDDI server, it can send the entire data structure to the server at this time. Then the UDDI parser transfers control back to the SOAP parser. The SOAP parser recognizes that the parse is still valid at this point. If it has been given back a deserialized data structure then it can hold onto it until it is later ready to pass it to the UDDI server. The SOAP parser then continues to parse the document, checking end tags against the tag stack 402 as it goes, and popping those tag names from the tag stack. When the SOAP parser reaches the end of the Body tag 308 it updates the State ID 406 (e.g., to 0) to indicate that the parsing processing is between data-tags, as shown in FIG. 15. The SOAP parser also updates the pointer 404 to point to the end of the Body tag 308.

Figure 16:
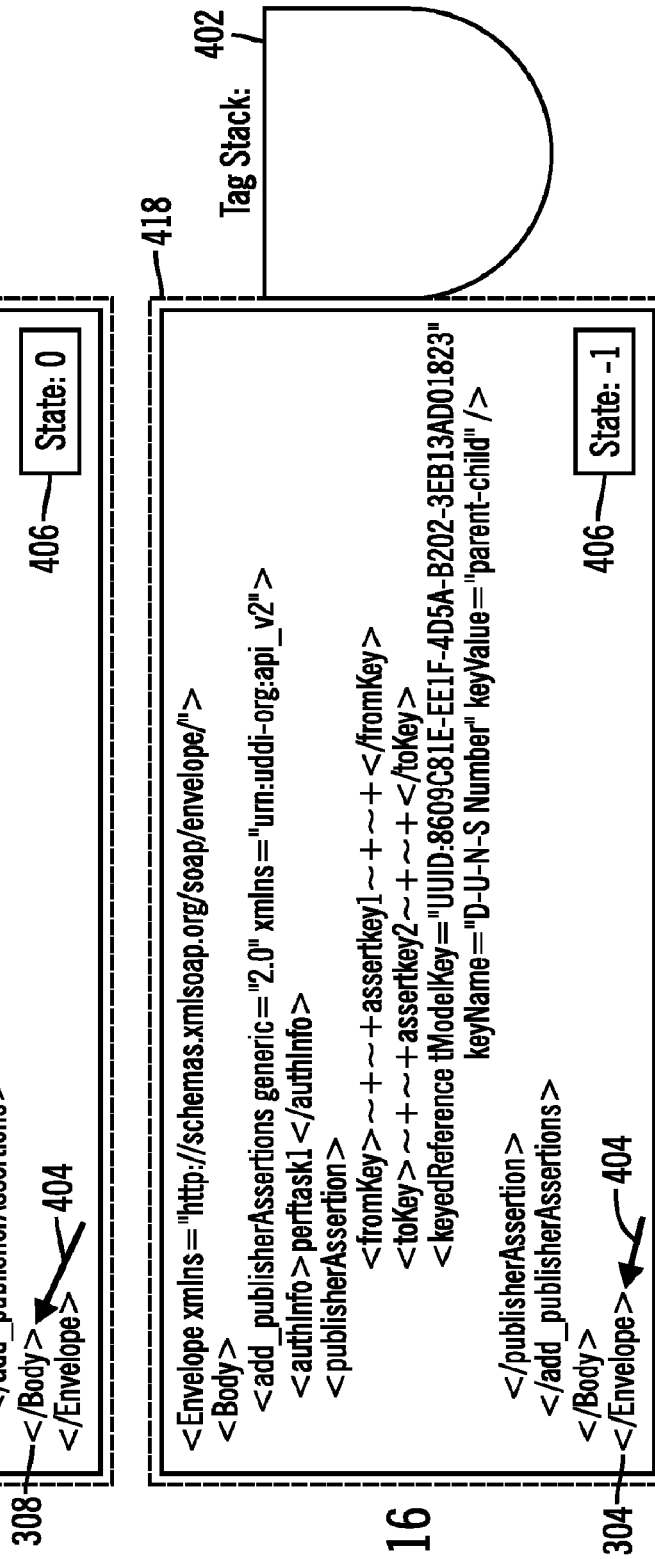

Finally, as shown in FIG. 16, the SOAP parser reaches the end of the top-level element of the document, the Envelope tag 304. Although the SOAP parser is at the end of the data-tag token Envelope 304, it updates the State ID 406 (e.g., to −1) to indicate that only trailing miscellaneous data is permitted and then an end of buffer is expected and not any CDATA sections or any other tags as per the XML specification. Once any optional trailing white space, etc. has been parsed, and the current pointer has reached the end of buffer pointer, then the SOAP parser has finished with the document.

All shared states are in an appropriate configuration for the end of the document, including that the current pointer 404 has reached the end of input buffer 418 (FIG. 4), the tag stack 402 is empty, the State ID 406 is −1, etc. As a team, the three parsers have ensured that the entire document is well-formed, and valid against several schemas as well as some extra requirements made by the UDDI server in addition to the schema requirements. If there is a data structure that the SOAP parser has been saving, then it can pass it back to the SOAP engine which passes it on to the UDDI server, with full knowledge that a legal and valid UDDI SOAP message has been received by the server. This data structure is optimized to be the data structure that the UDDI processor can use best with even the long UUID already being encoded into the form in which the UDDI server can use it.

As can be seen from the discussion above, the parsers worked together. Each parser was written only for its purpose, in a clean, maintainable, and extensible manner. Each one does a much faster job of parsing its part of the document than any other parser would. Each parser produces the ideal deserialization for the particular application that is using this parse. Thus, together, the three parsers are extremely maintainable, much faster than any current alternative, and produce the ideal deserialization.

Exemplary Processing of Parsing an XML Instance with Multiple Parsers

Figure 17:
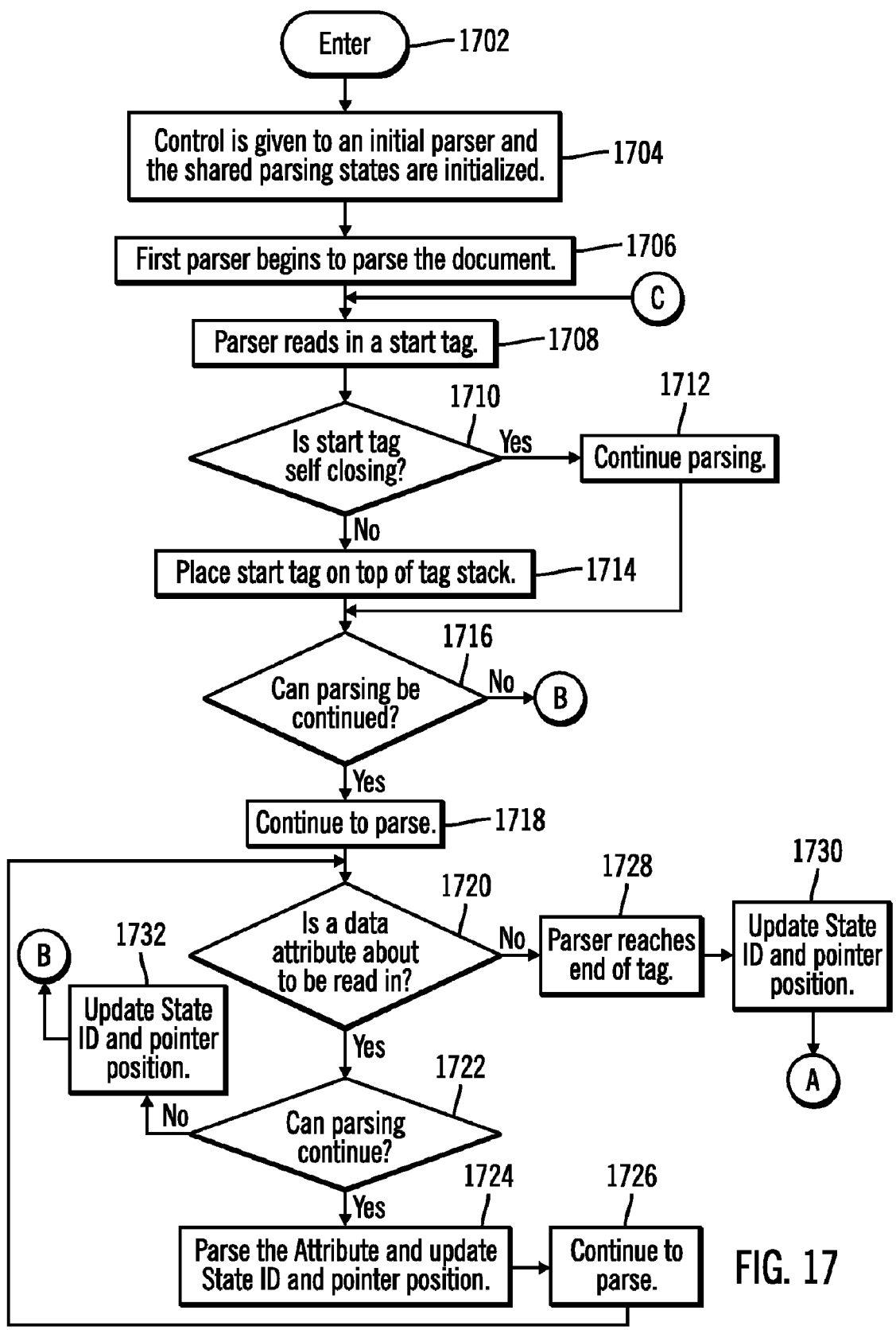
FIG. 17 is an operational flow diagram illustrating an exemplary process of jointly parsing an XML instance using multiple parsers according to an embodiment of the present invention.
Figure 18:
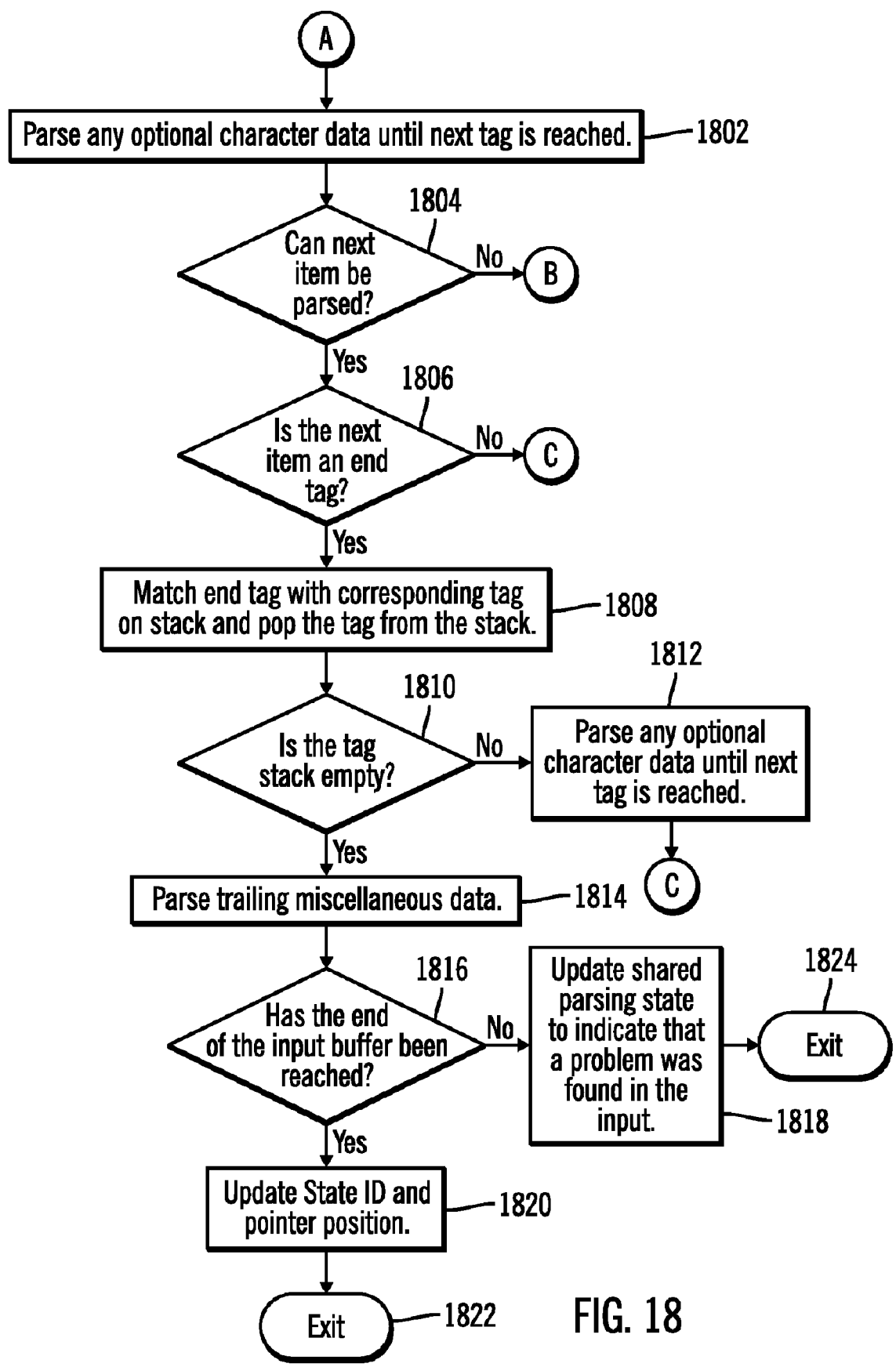
FIG. 18 is an operational flow diagram continuing the process of FIG. 17 according to an embodiment of the present invention.
Figure 19:
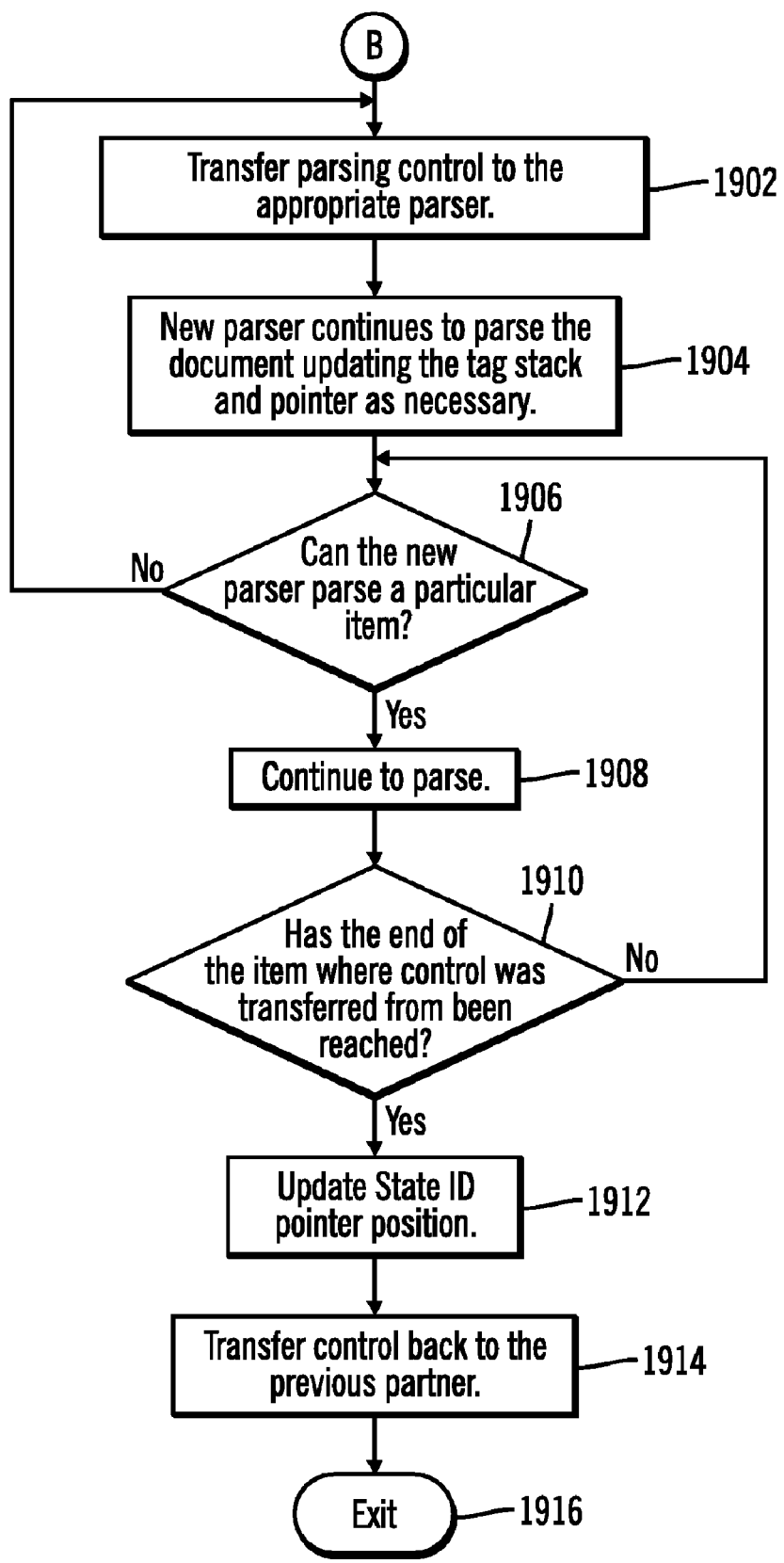
FIG. 19 is an operational flow diagram further illustrating the process of FIG. 17 where parsing control is transferred to another parser according to an embodiment of the present invention.

FIGS. 17-19 show an exemplary process of parsing an XML instance 126 using multiple parsers. The operational flow diagram of FIG. 17 begins at step 1702 and flows directly to step 1704. An initial parser 120, 122, at step 1704, is given parsing control and the shared parsing states are initialized. For example, the pointer 404 is positioned at the beginning of the input buffer, an empty tag stack 402 is created, and the State ID 406 is set to indicate that parsing is at the beginning of the document.

The first parser 120, 122, at step 1706, begins to parse the document. The parser 120, 122, at step 1708, reads in a start-tag. The parser 120, 122, at step 1710, determines if the tag is self closing. If the result of this determination is positive, the parser 120, 122, at step 1712, continues to parse. In other words, the start-tag is not placed on the tag stack 402. If the result of this determination is negative, the parser 120, 122, at step 1714, places the start-tag on the top of the tag stack 402. It should be noted that the determination of whether the start tag is self closing can be performed after step 1724 below. The parser 120, 122, at step 1716, determines if parsing can be continued. For example, the parser 120, 122 can recognize items that it can and cannot parse. If the result of this determination is negative, the control flows to entry point B of FIG. 19. If the result of this determination is positive, the parser 120, 122, at step 1718, continues to parse the XML instance 126.

The parser 120, 122, at step 1720, determines if a data attribute is about to be read in. If the result of this determination is negative, the parser 120, 122, at step 1728, reaches the end of the current data-tag. The parser 120, 122, at step 1730, updates the shared parsing state 128. For example, the parser 120, 122 can update the pointer position 404 to identify that parsing is at the end of the data-tag. The parser 120, 122 can also update the State ID 406 to reflect that the parsing is between data tags. The control then flows to entry point A of FIG. 18. If the result of this determination is positive, the parser 120, 122, at step 1722, determines whether it can continue to parse. In other words, the parser 120, 122 determines whether it can read in that particular attribute.

If the result of this determination is negative, the parser 120, 122, at step 1732, updates the shared parsing state. For example, the parser 120, 122 can update the pointer 404 to point to the beginning of the attribute. The parser 120, 122 can also update the State ID 406 to indicate that an attribute is about to be read in. The control then flows to entry point B of FIG. 19. If the result of this determination is positive, the parser 120, 122, at step 1724, updates the shared parsing state 128. For example, the parser 120, 122 reads in the attribute and can update the pointer 404 to point to the end of the attribute and update the State ID 406 to indicate that parsing is at the end of an attribute. The parser 120, 122, at step 1726, continues to parse and the control flows back to step 1720 where the parser 120, 122 determines if a data attribute is about to be read in, as discussed above.

The control then flows to entry point A of FIG. 18 where the parser 120, 122, at step 1802, parses any optional characters until the next tag is reached. If optional character data does not exist, the control flows directly to step 1804 from entry point A. The parser 120, 122, at step 1804, determines if the next item in the XML instance 126 can be parsed. If the result of this determination is negative, the control flows to entry point B of FIG. 19. If the result of this determination is positive, the parser 120, 122, at step 1806, determines if the next item in the XML instance 126 is an end tag. If the result of this determination is negative, the control flows to entry point C of FIG. 17 where the parser 120, 122, at step 1708, reads in a start-tag. The process continues as described above for FIG. 17. If the result of this determination is positive, the parser 120, 122, at step 1808, matches the end-tag to a tag in the stack and pops the corresponding start-tag from the tag stack 402.

The parser 120, 122, at step 1810, determines if the tag stack is empty. If the result of this determination is negative, the parser 120, 122, at step 1812, parses any optional characters until the next tag is reached. The control then flows to entry point C of FIG. 17. If the result of this determination is positive, the parser 120, 122, at step 1814, parses any trailing miscellaneous data. The parser 120, 122, at step 1816, determines if the end of the input buffer 418 has been reached. If the result of this determination is negative, the shared parsing state is updated to indicate that a problem was identified in the input. The control flow then exits at step 1824. If the result of this determination is positive, the parser 120, 122, at step 1820, updates the shared parsing state. For example, the State ID 406 can be updated to show that the parsing has reached the end of the XML instance 126 and that the pointer 404 is at the end of the input buffer. The control then exits at step 1822.

FIG. 19 shows the process discussed with respect to FIGS. 17 and 18 when the control is transferred to another parser 120, 122. The control enters at entry point B where the current parser 120, 122, at step 1902, transfers parsing control to the appropriate parser 120, 122. The new parser 120, 122, at step 1904, checks the shared paring state and continues to parse the document and updates shared parsing state as necessary. For example, the new parser 120, 122 checks the shared parsing state (e.g. the pointer 404 and State ID 406) to determine where to start parsing. As the new parser 120, 122 parses the document the shared state is updated to track the state of the parsing and the position of the parsing.

The new parser 120, 122, at step 1906, checks the item it is about to parse in order to determine if it can parse the item. If the result of this determination is negative, the control returns to step 1902 where control is handed off to a new parser 120, 122. If the result of this determination is positive, the parser 120, 122, at step 1908, continues parsing. For example, if the current parser 120, 122 determines that an attribute is about to be read it and cannot correctly parse the attribute, the current parser 120, 122 hands off parsing control to the appropriate parser 120, 122. The current parser 120, 122, at step 1910, determines if the end of the item where control was handed off from has been reached. For example, if control was handed off at the beginning of an attribute, the parser 120, 122 determines if the end of the attribute has been reached.

If the result of this determination is negative, the control returns to step 1906 where the parser 120, 122 determines if the next item can be parsed. If the result of this determination is positive, the parser 120, 122, at step 1912, updates the shared parsing state. For example, the State ID 406 can be updated to show that parsing is at the end of an attribute, between data-tags, and the like. The pointer 404 can also be updated to indicate the current position of the parsing process. The current parser 120, 122, at step 1914, transfers parsing control back to the parser 120, 122 from which it received the control. The control flow then exits at step 1916.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with one embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with one embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program, logic, language, or instruction but may be practiced with any such suitable program, logic, language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for parsing a hierarchical markup document, the method comprising:

parsing, by a first parser, at least a first part of a hierarchical markup document, the first parser being one of a set of parsers for jointly parsing the hierarchical markup document, wherein each parser in the set of parsers is an independent and different parser from every other parser in the set of parsers;

updating by the first parser a shared parsing state associated with the set of parsers during the parsing by the first parser, the first parser updating the shared parsing state with at least a current parsing position of the first parser and an indication of a specific parsing type that is required to be subsequently performed, and wherein the shared parsing state is accessible and updatable by a parsing controller and by individual parsers in the set of parsers independent of each other;

monitoring, by the parsing controller, the shared parsing state associated with the set of parsers during the parsing by the first parser, wherein the parsing controller is separate, distinct, and external from each parser in the set of parsers;

identifying, by the parsing controller based on the shared parsing state, a data item type that is to be parsed next;

identifying, by the parsing controller, at least a second parser that is capable of parsing the data item type that has been identified; and passing, by the parsing controller in response to identifying the at least a second parser, parsing control to the at least a second parser, in the set of parsers;

parsing, by the at least second parser, at least a second part of the hierarchical markup document, the second part being parsed differently than the first part; and monitoring, by the parsing controller, the shared parsing state during the parsing by the at least second parser.

2. The method of claim 1, wherein the shared parsing state includes at least one of:

a current parsing position of at least one parser in the set of parsers;

a tag stack;

a parsing State ID associated with at least one parser in the set of parsers;

an end pointer;

a prefix mapping environment; and a stack of changes to the prefix mapping environment.

3. The method of claim 1, wherein the passing parsing control to the at least second parser, further comprises:

determining that a current parsing position of the first parser is at a data type associated with the at least second parser, wherein the determining is performed by the first parser.

4. The method of claim 1, wherein the hierarchical document is an extensible markup language document.

5. The method of claim 1, further comprising:

determining, in response to the monitoring of the shared parsing state during the parsing by the at least second parser, that the at least second parser has completed parsing data in the hierarchical markup document associated with the at least second parser; and passing the parsing control to one of:

the first parser, and at least a third parser.

6. The method of claim 1, wherein the passing parsing control to the at least second parser further comprises:

analyzing a parser control table; and identifying, in response to the analyzing, a parser capable of parsing a data type associated with data at the current parsing location of the first parser.

7. The method of claim 1, wherein the parsing by the first parser further comprises:

updating the shared parsing state during the parsing by the first parser, wherein the shared parsing state includes information used by a subsequent parser for determining a location within the hierarchical markup document to begin parsing.

8. The method of claim 1, wherein the parsing by the at least second parser further comprises:
updating the shared parsing state during the parsing by the at least second parser, wherein the shared parsing state includes information used by a subsequent parser for determining a location within the hierarchical markup document to begin parsing.

9. The method of claim 1, further comprising:
determining, by the parsing controller, the at least second parser parsed at least a portion of at least one additional data item associated with at least one other parser;
backing up, by the parsing controller, the at least second parser to a location that is prior to the at least one additional data item; and
passing control, by the parsing controller, to the at least one other parser to parser the at least one additional data item.

10. An information processing system comprising:
a memory;
a processor communicatively coupled to the memory;
a plurality of parsers for parsing at least a portion of a hierarchical markup document residing in the memory; and
a parsing controller communicatively coupled to the plurality of parsers, wherein the parsing controller is for:
initializing a first parser in the plurality of parsers, the first parser parsing at least a first part of the hierarchical markup document in response to being initialized, the first parser being one of a set of parsers for jointly parsing the hierarchical markup document, wherein each parser in the set of parsers is an independent and different parser from every other parser in the set of parsers, wherein the parsing controller is separate, distinct, and external from each parser in the set of parsers,
where the first parser updates a shared parsing state associated with the set of parsers during the parsing by the first parser, the first parser updating the shared parsing state with at least a current parsing position of the first parser and an indication of a specific parsing type that is required to be subsequently performed;
monitoring the shared parsing state associated with the set of parsers during the parsing by the first parser;
identifying, based on the shared parsing state, a data item type that is to be parsed next;
identifying at least a second parser in the set of parsers that is capable of parsing the data item type that has been identified; and
passing in response to identifying the at least a second parser, parsing control to the at least a second parser, wherein the at least second parser parses at least a second portion of the hierarchical markup document, and wherein the second parser independently obtains shared parsing state information from the shared parsing state to parse the second portion; and
monitoring the shared parsing state during the parsing by the at least second parser.

11. The information processing system of claim 10, wherein the passing parsing control to the at least second parser by the parser controller, further comprises:
determining that the current parsing position of the first parser is at a data type associated with the at least second parser.

12. The information processing system of claim 10, wherein the parsing controller is further for:
determining, in response to the monitoring of the shared parsing state during the parsing by the at least second parser, that the at least second parser has completed parsing data in the hierarchical markup document associated with the at least second parser; and
passing the parsing control to one of:
the first parser, and
at least a third parser.

13. The information processing system of claim 10, wherein the passing parsing control to the at least second parser by the parsing controller further comprises:
analyzing a parser control table; and
identifying, in response to the analyzing, a parser capable of parsing a data type associated with data at the current parsing location of the first parser.

14. A non-transitory computer readable storage medium for parsing a hierarchical markup document, the computer readable medium comprising instructions for:
parsing, by a first parser, at least a first part of a hierarchical markup document, the first parser being one of a set of parsers for jointly parsing the hierarchical markup document, wherein each parser in the set of parsers is an independent and different parser from every other parser in the set of parsers;
updating by the first parser a shared parsing state associated with the set of parsers during the parsing by the first parser, the first parser updating the shared parsing state with at least a current parsing position of the first parser and an indication of a specific parsing type that is required to be subsequently performed, and wherein the shared parsing state is accessible and updatable by a parsing controller and by individual parsers in the set of parsers independent of each other;
monitoring, by the parsing controller, the shared parsing state associated with the set of parsers during the parsing by the first parser, wherein the parsing controller is separate, distinct, and external from each parser in the set of parsers;
identifying, by the parsing controller based on the shared parsing state, a data item type that is to be parsed next;
identifying, by the parsing controller, at least a second parser that is capable of parsing the data item type that has been identified; and
passing, by the parsing controller in response to identifying the at least a second parser, parsing control to the at least a second parser, in the set of parsers;
parsing, by the at least second parser, at least a second part of the hierarchical markup document, the second part being parsed differently than the first part; and
monitoring, by the parsing controller, the shared parsing state during the parsing by the at least second parser.

15. The non-transitory computer readable storage medium of claim 14, wherein the shared parsing state includes at least one of:
a current parsing position of at least one parser in the set of parsers;
a tag stack;
a parsing State ID associated with at least one parser in the set of parsers;
an end pointer;
a prefix mapping environment; and
a stack of changes to the prefix mapping environment.

16. The non-transitory computer readable storage medium claim 14, wherein the instructions for passing parsing control to the at least second parser, further comprises instructions for:

determining that the current parsing position of the first parser is at a data type associated with the at least second parser.

17. The non-transitory computer readable storage medium of claim 14, further comprising instructions for:

determining, in response to the monitoring of the current parsing position of the at least second parser, that the at least second parser has completed parsing data in the hierarchical markup document associated with the at least second parser; and passing the parsing control to one of:
        the first parser, and
        at least a third parser.

18. The non-transitory computer readable storage medium of claim 14, wherein the instructions for passing parsing control to the at least second parser further comprises instructions for:

analyzing a parser control table; and identifying, based on the analyzing, a parser capable of parsing a data type associated with data at the current parsing location of the first parser.

19. The non-transitory computer readable storage medium of claim 14, wherein the instructions for parsing by the first parser further comprise instructions for:

updating the shared parsing state during the parsing by the first parser, wherein the parsing state includes information used by a subsequent parser for determining a location within the hierarchical markup document to begin parsing.

20. The non-transitory computer readable storage medium of claim 14, wherein the instructions for parsing by the at least second parser further comprise instructions for:

updating the shared parsing state during the parsing by the at least second parser, wherein the parsing state includes information used by a subsequent parser for determining a location within the hierarchical markup document to begin parsing.

\* \* \* \* \*